M. A. VOLF.
TIRE.
APPLICATION FILED MAY 6, 1921.

1,421,323.

Patented June 27, 1922.

Matt A. Volf
INVENTOR

BY Victor J. Evans
ATTORNEY

WITNESS:

M. A. VOLF.
TIRE.
APPLICATION FILED MAY 6, 1921.
1,421,323.
Patented June 27, 1922.
2 SHEETS—SHEET 2.
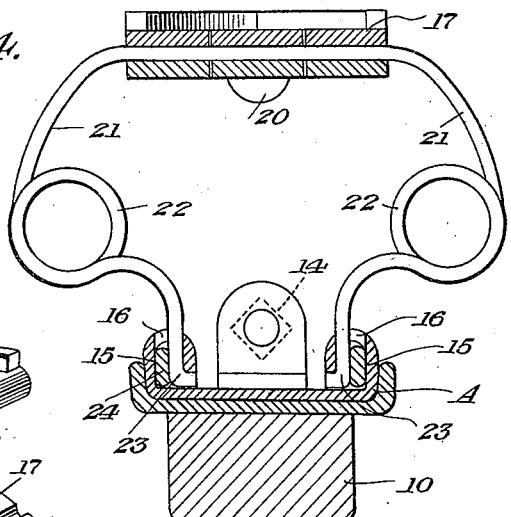
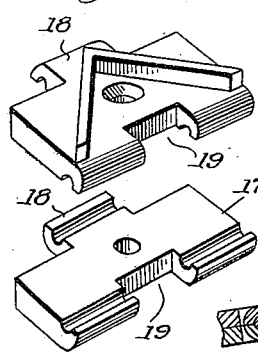
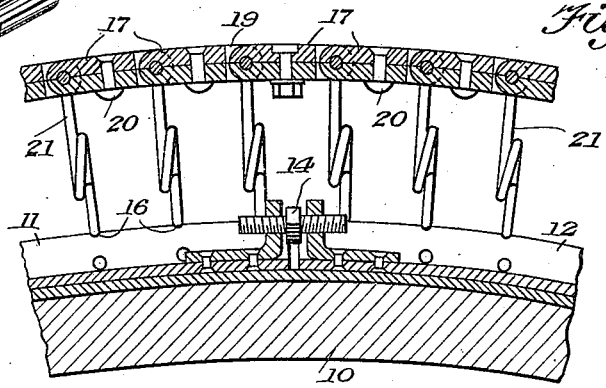
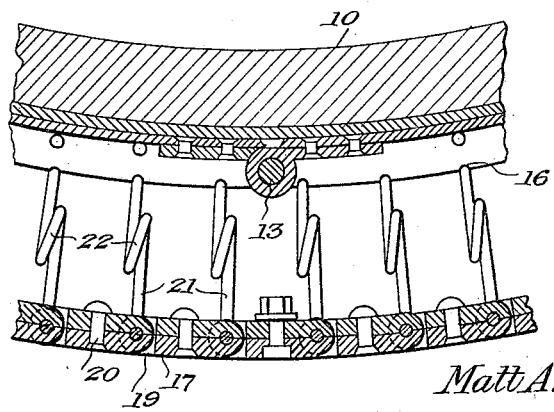
Matt A. Volf
INVENTOR
BY Victor J. Evans
ATTORNEY
WITNESS:

UNITED STATES PATENT OFFICE.

MATT A. VOLF, OF PICKENS, WEST VIRGINIA.

TIRE.

1,421,323.   Specification of Letters Patent.   Patented June 27, 1922.

Application filed May 6, 1921. Serial No. 467,372.

*To all whom it may concern:*

Be it known that I, MATT A. VOLF, a subject of the Government of Austria, residing at Pickens, in the county of Randolph and State of West Virginia, have invented new and useful Improvements in Tires, of which the following is a specification.

The present invention comprehends the provision of a resilient tire, wherein use of a pneumatic inner tube is dispensed with, to eliminate tire trouble incident to punctures and blow-outs, the tire being made up of a plurality of solid sections designed for interfitting engagement, and supported in spaced relation to the tire rim by resilient means which affords the tire all of the desired resiliency.

In carrying out the invention, I also provide a tire rim of special construction so that the resilient means above referred to can be easily and quickly associated with the rim or removed therefrom as the occasion requires.

The nature and advantages of the invention will be better understood when the following detailed description is read in connection with the accompanying drawings, the invention residing in the combination, construction, and arrangement of parts as claimed.

In the drawings forming part of this application, like numerals of reference indicate similar parts in the several views and wherein:

Figure 2 is an enlarged sectional view showing the connection between the meeting ends of the tire rim.

Figure 3 is a similar view showing the hinged connection between the rim sections.

Figure 4 is a sectional view taken on line 4—4 of Figure 1.

Figure 6 shows detail views of the tread sections.

Figure 1:
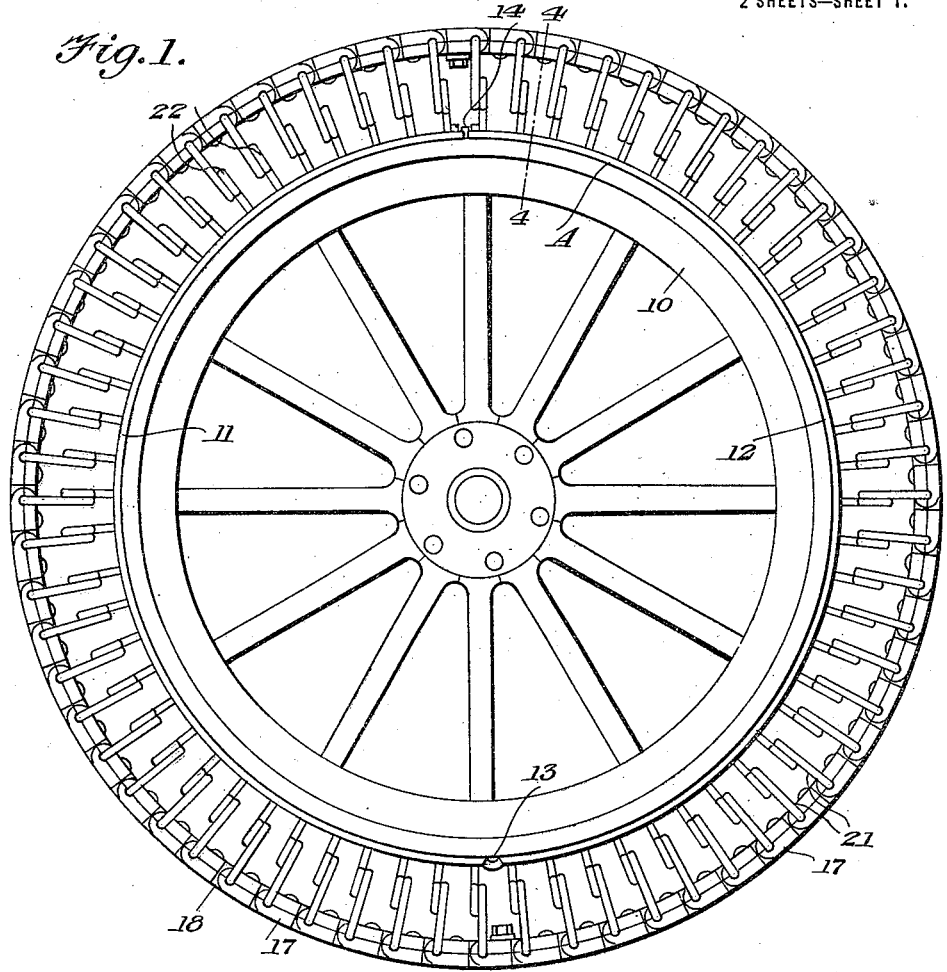
Figure 1 is a side elevation of a wheel showing a tire in position thereon.
Figure 5:
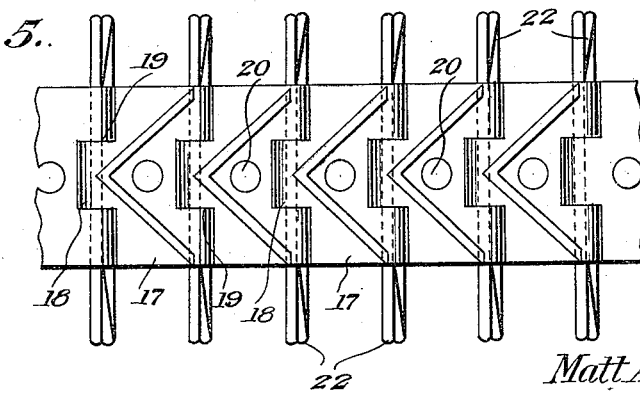
Figure 5 is a fragmentary plan view of the tread portion of the tire.

Referring to the drawings in detail, 10 indicates a wheel of usual construction adapted to support the tire rim A.

The rim A is preferably constructed in two sections 11 and 12 respectively, these sections being hingedly connected together as at 13 by means of links, although the hinge itself can be of any suitable design. The meeting end of the rim sections may also be secured in any suitable manner, preferably by means of a left and right hand thread bolt 14. The opposed sides of the rim sections are formed to provide closed channels 15, the latter being provided with spaced openings 16 for a purpose to be presently described.

The tire construction in accordance with the invention includes a tread made up of a plurality of solid sections 17, each section having a reduced extension 18 which is received by a recess 19 formed in the adjacent section. Each section is made up of two co-operating parts as shown. In this manner, the respective sections of the tire are interfitted, and are also joined together by the fastening elements 20. The tread is supported in spaced relation to the rim A by means of resilient elements 21, these elements having a portion passed through each tread section and projecting an appreciable distance beyond the sides thereof. The projecting portions of the elements 21 are formed to provide resilient coils 22, and finally terminate to provide extensions 23 which are received by the openings 16 of the rim. These retaining bars as clearly shown in Figure 4 are positioned between the sides of the rim A and the terminals of the resilient elements, thereby holding the terminals of the resilient elements immovably positioned within the openings 16. The tire in its entirety can be quickly removed from the rim by separating the meeting ends of the tire rim sections, and then removing the retaining bars 24, after which the resilient elements can be easily removed from the openings 16. The construction and arrangement of parts is such that the tire although made up of solid tread sections, possesses all the resiliency embodied in a pneumatic tire, and at the same time eliminates all trouble incident to punctures and blow-outs experienced with the use of pneumatic tires.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What is claimed is:

1. In combination, a tire rim formed to provide channels at the sides thereof, one wall of each channel having a plurality of spaced openings, a tire tread, and resilient elements supporting said tread in spaced relation to the rim, said elements having their terminals received by said openings, and means interposed between said elements and the sides of the rim for securing the resilient elements to the rim.

2. In combination, a tire rim made up of two hingedly connected sections, means for associating the meeting ends of said sections, said rim being formed to provide channels at the sides thereof, one wall of each channel having spaced openings, a tire tread, resilient elements associated with the tread and terminally fitted in said openings, retaining elements arranged in the channels for holding the resilient elements to said rim, and said resilient elements supporting the tread in spaced relation to the rim.

In testimony whereof I affix my signature.

M. A. VOLF.